United States Patent [19]
Springer

[11] Patent Number: 5,531,557
[45] Date of Patent: Jul. 2, 1996

[54] DRIVE SCREW SYSTEM WITH NESTED MOBILE SUPPORTS

[75] Inventor: Scott L. Springer, Milwaukee, Wis.

[73] Assignee: Rite-Hite Corporation, Milwaukee, Wis.

[21] Appl. No.: 269,835

[22] Filed: Jul. 1, 1994

[51] Int. Cl.⁶ .......................... B60T 3/00; B65G 67/02; F16H 25/20

[52] U.S. Cl. .......................... 414/401; 74/89.15; 188/32; 254/98; 384/53; 410/30; 414/584

[58] Field of Search .......................... 74/89.15, 424.8 R; 188/32; 410/30; 254/98; 414/396, 584, 401; 384/53

[56] References Cited

U.S. PATENT DOCUMENTS

| | | | |
|---|---|---|---|
| 2,961,277 | 11/1960 | Sternlicht | 308/78 |
| 3,305,049 | 2/1967 | Willey | 188/32 |
| 3,728,903 | 4/1973 | Haller | 74/89.15 |
| 4,593,572 | 6/1986 | Linley, Jr. | 74/441 X |
| 4,604,027 | 8/1986 | Becker et al. | 414/749 |
| 4,878,390 | 11/1989 | Hauser | 74/89.15 |
| 5,127,285 | 7/1992 | Granhom | 74/527 |
| 5,251,501 | 10/1993 | Katahira | 74/89.15 |
| 5,375,965 | 12/1994 | Springer et al. | 414/401 X |

FOREIGN PATENT DOCUMENTS

| | | |
|---|---|---|
| 2-4737 | 1/1990 | Japan . |
| 2-72254 | 3/1990 | Japan . |
| 2-66359 | 3/1990 | Japan . |
| 2-150538 | 6/1990 | Japan . |
| 386190 | 6/1973 | U.S.S.R. . |

OTHER PUBLICATIONS

Actionjac Metric—Power Cylinders T–Series—Multi—Series—Nook Industries, The Linear Motion People.
Ad for Amacoil/Uhing Linear Drive System.
Ad for NSK Corporation in IMTS94.

Primary Examiner—Allan D. Herrmann
Attorney, Agent, or Firm—Leydig, Voit & Mayer, Ltd.

[57] ABSTRACT

The drive screw system comprises a drive screw and a drive nut adapted for driving a cooperating member such as a vehicle restraining device between the proximal and distal ends of the drive screw. At least one bearing assembly is mounted to a track for supporting the drive screw and automatically moving between the proximal and distal ends of the drive screw in response to the drive nut to automatically maintain a predetermined maximum unsupported length of the drive screw. Each bearing assembly comprises two bearing supports connected at a fixed length and which are coaxially disposed relative to each other. In one embodiment, the length of each bearing assembly are integral multiples of the smallest fixed connecting length and the drive screw has stationary bearing supports disposed at the proximal and distal ends wherein the distance between the stationary supports is (n+1)*L where n is the number of bearing assemblies and L is the length of the shortest bearing assembly.

53 Claims, 6 Drawing Sheets

DRIVE SCREW SYSTEM WITH NESTED MOBILE SUPPORTS

FIELD OF THE INVENTION

The present invention relates generally to rotating drive screw systems for linearly positioning a cooperating member and, more particularly, to drive screw systems utilizing functional and mobile bearing supports for dampening excessive vibrations and minimizing buckling.

BACKGROUND OF THE INVENTION

Drive screw systems are typically utilized to linearly position a cooperating member such as a drive nut or other assembly in response to rotation of the drive screw. Thus, it is typically desirable to rotate the drive screw as quickly as possible to achieve linear displacement as quickly as possible. When a shaft such as drive screw and the like rotates, natural vibrations are induced in the drive screw when its rotation reaches a characteristic critical speed of rotation. Such vibration may be excessive with resultant damage to the system. The critical speed is dependent inter alia on the diameter of the rotating drive screw, its unsupported length and on the speed at which the drive screw rotates. The smaller the diameter/length ratio, the lower the speed at which the drive screw can be permitted to rotate, if the drive screw is to be prevented from reaching its critical speed. Consequently, the rotational speed of longer drive screws must be kept low, and the speed at which the nut moves along the drive screw will therefore be correspondingly slow. Additionally, axial compression loads exerted on the drive screw system may cause buckling. In order to increase the rotational speed of the drive screws without inducing natural vibrations in them and to increase axial compression load carrying capacity without buckling, it has been necessary to use rigid support bearings or other structures to minimize the unsupported length of the rotating drive screw.

OBJECTS AND SUMMARY OF THE INVENTION

It is an object of the present invention to provide a system for increasing the effective length of the drive screw.

It is an object of the present invention to provide a system for increasing the rotational speed of rotating drive screw systems.

It is an object of the present invention to provide a system for dampening excessive vibrations in drive screw systems at critical speeds.

It is an object of the present invention to provide a system for increasing axial load carrying capacity without buckling in drive screw systems.

It is an object of the invention to provide bearings which can be adjustably positioned along the length of the drive screw to prevent vibrations at critical speeds.

It is an object of the invention to provide bearings which can be automatically positioned along the length of the drive screw to minimize the unsupported length of the drive screw, to achieve increase rotational speeds, and to prevent vibrations at critical speeds. A related object to provide a such a drive screw system for driving a vehicle restraining device.

It is an object of the invention to provide bearings for a rotating drive screw which enables the use of drive screws having smaller diameters than formerly permitted because of excessive vibrations at critical speeds.

One object of the present invention is to eliminate the occurrence of natural vibrations or oscillations in the drive screw system as the drive screw is rotated to axially advance and retract a drive nut threadedly mounted on the drive screw.

Another object of the present invention is to provide a linear actuator system for effective linear displacement of a cooperating member.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
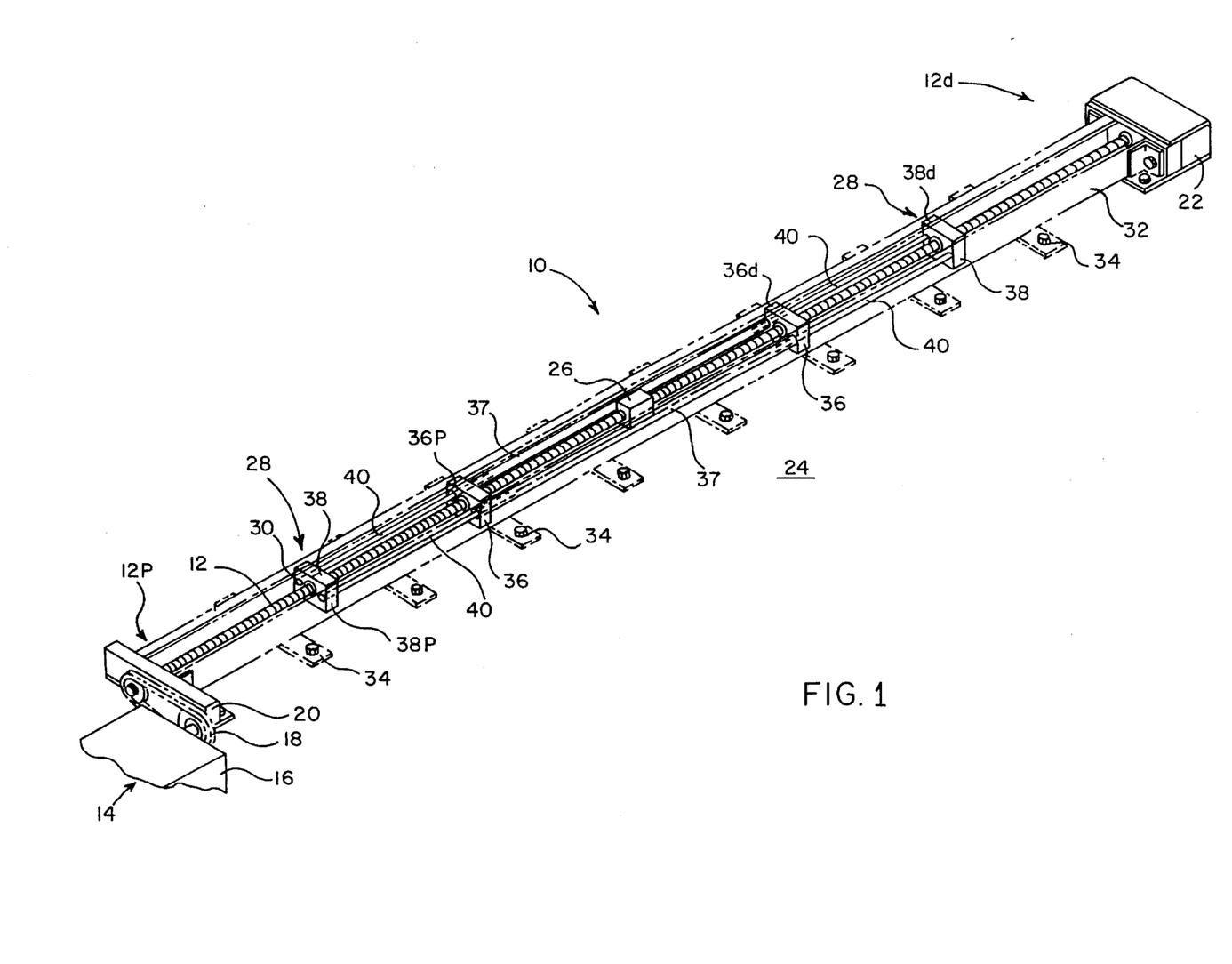
FIG. 1 is a perspective view of the drive screw system in accordance with the invention showing a drive screw for linearly positioning a cooperating member such as a drive nut, wherein the drive screw is intermediately supported by mobile support bearings.

Referring to the drawings and more particularly to FIG. 1, a drive screw system 10 having nested mobile supports is shown in accordance with the present invention. The system 10 has a threaded drive screw 12. In the illustrated embodiment, the means 14 for rotating the drive screw 12 is depicted as a motor 16 and chain assembly 18, although other methods will be known to those skilled in the art. For reference, the drive screw 12 has a proximal end 12p and a distal end 12d which are mounted to stationary bearings 20, 22 rigidly fixed to the supporting surface 24. A drive nut 26 in FIG. 1 threadedly engages the drive screw 12 for linear movement between the proximal and distal ends 12p, 12d in response to rotation of the drive screw 12. A cooperating member or assembly is typically operatively connected to the drive nut for linearly displacement in response to rotation of the drive screw.

Figures 8, 9:
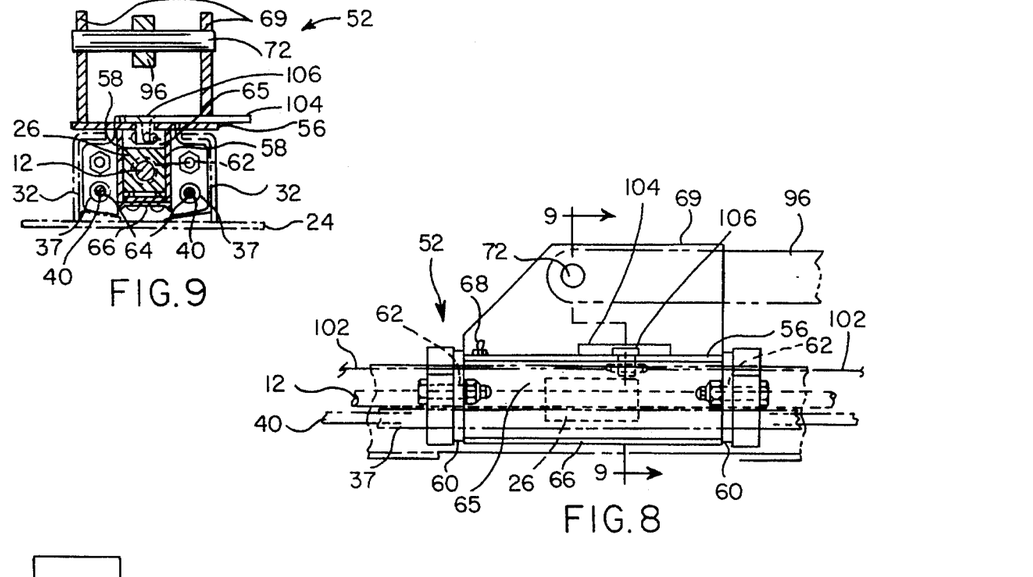
FIG. 8 is an elevational view of the drive nut and the trolley assembly used for moving the sled assembly.
FIG. 9 is a sectional view taken along line 9—9 in FIG. 8 showing the trolley assembly for moving the sled assembly.

In accordance with certain objects of the invention, the system 10 has at least one mobile bearing support, generally depicted as 28 in FIG. 1, defining a central hole 30 for slidably receiving the drive screw 12 in order to support the intermediate portions of the drive screw 12. The drive screw 12 and the bearings 28 are mounted within a guide track 32. The guide track 32 controls both the linear movement of the bearings 28 between the proximal and distal ends 12p, 12d and the vertical movement of the bearings 28 in response to the vibration of the drive screw 12. In the illustrated embodiment, the guide track 32 is depicted as opposing C-shaped sections as best shown in FIG. 9, although other structures will be known to those skilled in the art. The guide track 32 and the stationary bearings 20, 22 are attached to the supporting surface 24 using bolts 34 or the like, thereby fixing the system 10 in a desired position and preventing linear or vertical movement.

The illustrated embodiment of the system 10 has two pairs of bearings forming an inner bearing assembly 36 coaxially nested within an outer bearing assembly 38. For reference, the inner bearing assembly 36 has proximal and distal bearings 36p, 36d which are connected by a pair of rigid tubes 37 and the outer bearing assembly 38 has proximal and distal bearings 38p, 38d which are connected by a pair of rods 40. In the illustrated embodiment, the rod 40 is disposed coaxially with respect to the tube 37 so that the inner and outer bearing assemblies 36, 38 may slide independently of each other. This structure maintains the respective bearing assemblies 36, 38 at a constant predetermined length.

Figure 2:
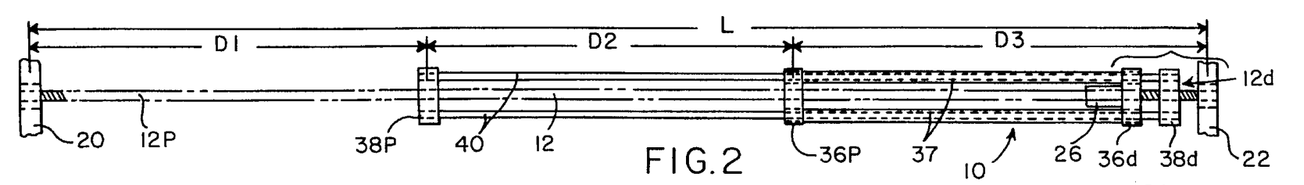
FIG. 2 is a schematic diagram of the drive system shown in FIG. 1 wherein the drive nut is positioned at the right/distal position.
Figure 3:
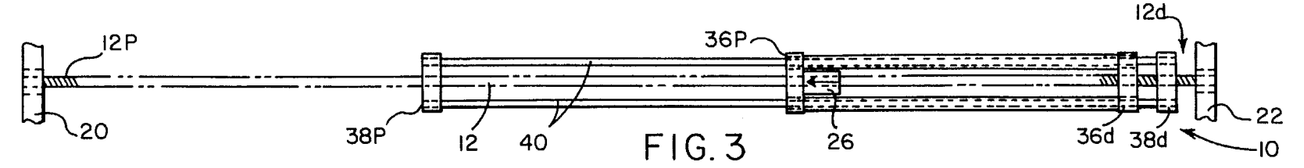
FIG. 3 is a schematic diagram of the drive system shown in FIG. 1 wherein the drive screw is rotating so as to drive the nut and the inner bearing assembly to the left/proximal position.
Figure 4:
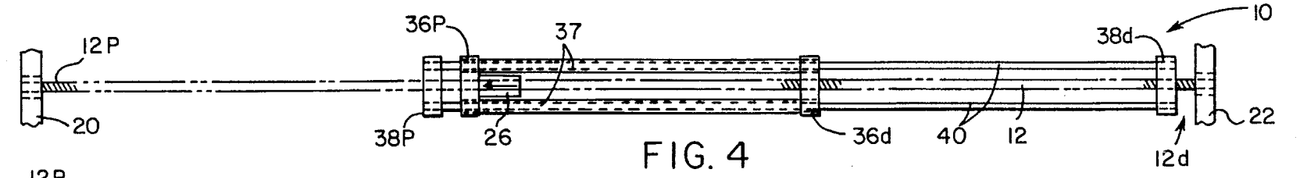
FIG. 4 is a schematic diagram of the drive system shown in FIG. 1 wherein the drive nut is moving the inner and outer bearing assemblies to the left/proximal position.
Figure 5:
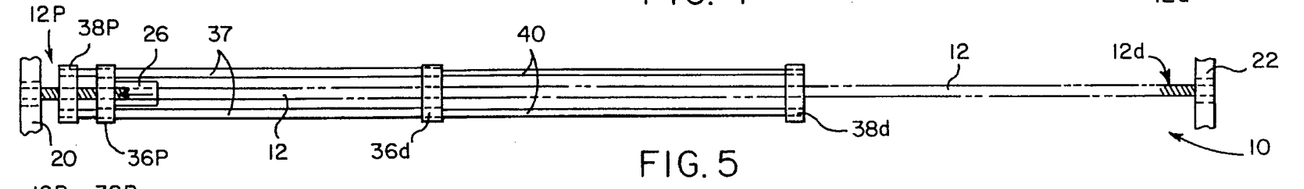
FIG. 5 is a schematic diagram of the drive system shown in FIG. 1 wherein the drive nut has moved the inner and outer bearing assemblies to the left/proximal position.
Figure 6:
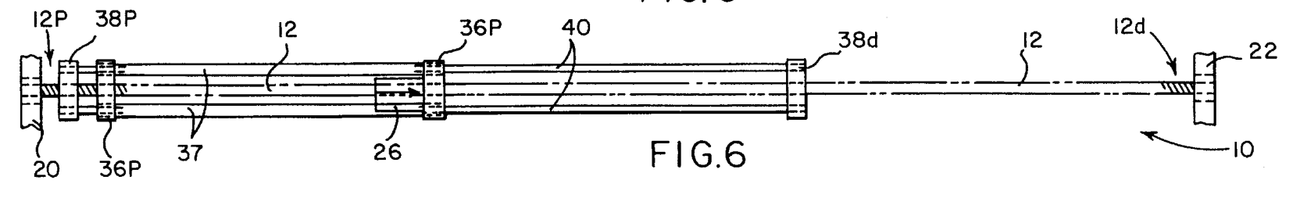
FIG. 6 is a schematic diagram of a drive system shown in FIG. 1 wherein the drive screw is rotating so as to move the drive to the right/distal position and is engaging the distal end of the inner bearing assembly.

The operation of the system 10 is best illustrated in schematic diagrams in FIGS. 2–6. In general, the movement of the drive nut 26 causes the inner and the outer assemblies 36, 38 to slide between the proximal and distal ends 12p, 12d of the drive screw 12. In FIG. 2, the nut 26 and the distal bearings 36d, 38d of the inner and outer assemblies 36, 38, respectively, are disposed at the distal end 12d of the drive screw 12. As the nut 26 moves towards the proximal end 12p (to the left in the figures) in response to the rotation of the shaft 12, the nut 26 engages the proximal end 36p of the inner assembly 36, as generally shown in FIG. 3. The leftward movement of the nut 26 thereby moves the inner assembly 36 towards the left, as shown in FIG. 4. It will be seen that the coaxial nature of the rod 40/tube 37 combination permits the inner assembly 36 to move independently of the outer assembly 38, while maintaining the respective lengths of the inner and outer assemblies 36, 38. Referring to FIG. 4, the leftward movement of the nut 26 causes the proximal bearing 36p of the inner assembly 36 to engage the proximal bearing 38p of the outer assembly 38. The leftward movement of the nut 26 continues to move the outer assembly 38 (and the inner assembly 36) towards the proximal end 12p, as generally shown in FIG. 5. FIG. 6 illustrates the inner and outer assemblies 36, 38 at the proximal end 12p of the shaft 12 and the nut 26 moving towards the distal end 12d which ultimately effects movement of the inner and outer assemblies 36, 38 in a reverse fashion towards the distal end 12d (towards the right in the figures).

Referring to FIG. 2, it will be seen that the mobile bearings 36, 38 separate the length L of the drive screw 12 between the proximal and distal bearings 20, 22 into three unsupported segments D1, D2, and D3. It will be appreciated that the drawings are not drawn to scale; the bearings and the spaces between the bearings in FIG. 2–6 are shown relatively oversize for ease of reference. Since the critical speed of the drive screw 12 is inversely proportional to the unsupported length of the screw, a longer length drive screw requires a smaller drive screw rotational speed to prevent vibrations at the critical speeds. Conversely, a shorter drive screw length permits a higher drive screw rotational speed or a larger diameter drive screw. Thus, it is preferable that each unsupported segment D1, D2, D3 be of approximately equal lengths to maximize the safe allowable rotational speed of a smaller diameter, more economical drive screw 12. Thus, in the illustrated embodiment, each segment D1, D2, D3 has a drive screw length of approximately L/3. Since the length of each unsupported segment D1, D2, D3 depends upon the length of the inner and outer assemblies 36, 38, it will be seen that the length of the inner assembly 36 is L/3 and the length of the outer assembly 38 is twice the length of the inner assembly 36 or 2L/3. It should now be appreciated that, as the inner assembly 36 moves between the proximal end 12p and the distal end 12d of the drive screw 12, the maximum unsupported length of the drive screw is L/3.

The rigidly-attached connected pairs of mobile supports 36, 38 which form the bearing assemblies permit the maximum unsupported length of the drive screw 12 to remain within predetermined limits; i.e. in the illustrated embodiment, the maximum unsupported length is L/3. It will be appreciated that any number of bearing assemblies may be added to the drive screw 12. In an embodiment containing a plurality of bearing assemblies, it is desirable that the shortest bearing assembly be formed of a pair of bearings which are rigidly fixed at a standard predetermined length "d" which prevents vibrations at the normal operational speeds of the system. Each successive bearing assembly may be formed of a pair of bearings which are rigidly fixed at integral multiples of the smallest fixed length. Thus, the stationary bearings 20, 22 would be separated by a distance (n+1).d where n is the number of bearing assemblies and d is the fixed length of the shortest bearing assembly and the maximum unsupported length.

In the embodiment illustrated bearing in FIGS. 1–6, for example, which contains a "two-bearing" assembly system (i.e., n=2), assuming that the inner bearing assembly 36 has a fixed predetermined length of one foot, the second successive nested assembly 38 would be two feet in length and the length between the stationary bearings would be three feet. If a third assembly was added to the illustrated system, the third successive nested assembly would be three feet in length and the stationary bearings would be four feet apart.

In one application, the drive screw system may be utilized to linearly position a cooperating member such as, for example, a vehicle restraining device of the type described in U.S. patent application Ser. No. 08/008,757, filed on Jan.

Figure 7:
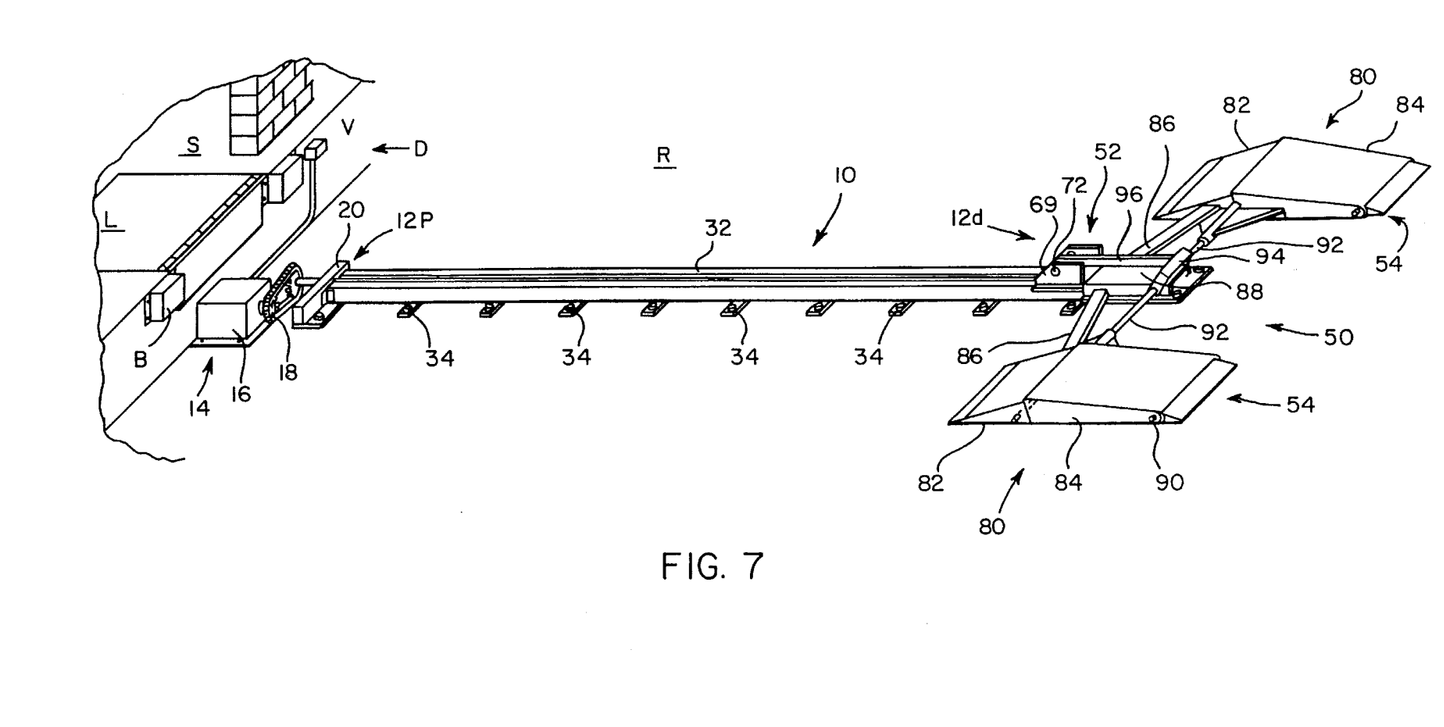
FIG. 7 is a perspective view of the drive system in FIG. 1 utilized for linearly positioning a vehicle restraining device in accordance with the invention.

25, 1993, now U.S. Pat. No. 5,375,965 and which is incorporated herein by reference. FIG. 7 illustrates the system 10 disposed in the driveway of a loading dock and operatively connected to the one embodiment of a vehicle restraining device 50 used to restrain movement of a vehicle (not shown) parked in a loading dock.

The vehicle restraining device 50 is shown installed in the center of a conventional loading dock roadway R normally provided at warehouses, truck terminals, manufacturing plants and the like where raw materials and products are received and/or dispatched by truck vehicles. The conventional loading dock D is normally provided with a horizontal surface or deck S over which loading equipment such as forklift trucks and the like and dock personnel maneuver during the loading and unloading operation. The dock D is typically provided with a conventional leveler assembly L which is adapted to compensate for height differentials between the deck S and the upper supporting surface of the truck bed (not shown). In addition, the dock D normally includes a vertical wall V or surface against which the rear end of the truck abuts during the loading and unloading operations. The surface V is provided with suitable bumpers B or fenders which are engaged by the rear of the vehicle thereby preventing damage or defacement of either the dock D or the vehicle when the vehicle is backing into position. The vehicle restraining device 50 is intended to effectively and readily secure the truck in proper position relative to the dock D and prevent the truck from inadvertently moving away from the dock D during the loading and unloading operation.

The drive screw system 10 is fixedly disposed on the roadway R so that its longitudinal axis is generally perpendicular to the dock wall V and it will be generally parallel to the longitudinal axis of the truck when the rear of the truck is adjacent the loading dock D. The drive system 10 controls the positioning of the vehicle restraining device 50 between the distal and proximal ends 12d, 12p.

The vehicle restraining device 50 comprises a sled assembly 54 adapted for engaging at least one of the truck wheels and for securing the truck from movement. A trolley assembly 52 is utilized for operatively connecting the sled assembly 54 and the drive nut 26 so that the sled assembly 54 can be positioned between distal and proximal positions 12d, 12p relative to the dock wall V in response to the rotation of the drive screw 12.

In the illustrated embodiment, the sled assembly 54 comprises a pair of lock assemblies 80 which are spaced on either side of the drive screw system 10, each lock assembly 80 adapted for engaging the wheels located on either side of the truck. The lock assemblies 80 are supported on roadway R by retractable wheels 81 shown in FIG. 7a. Each lock assembly 80 comprises a locking arm 84 pivotally attached to the base 82 by linkage 83 for rotating between a retracted position shown in FIG. 7 and an extended position shown in FIG. 7a. The distal end of the locking arm 84 is pivotally attached to the base 82 at pin 90 so that the proximal end of the locking arm 84 is free to rotate from the retracted position to the extended position for directly engaging the wheel. When the locking arm 84 is in the retracted position, the truck can drive into and out of the loading dock D. In the extended position (FIG. 7a), the locking arm 84 projects upwardly in order to create a barrier preventing the truck from inadvertently driving forward during the loading and unloading operation. Arms 86 rigidly attach the base 82 to the cover means 88 which is adapted to slidably engage the guide track 32 and maintain alignment between the sled assembly 54 and the drive screw system 10.

Figure 7A:
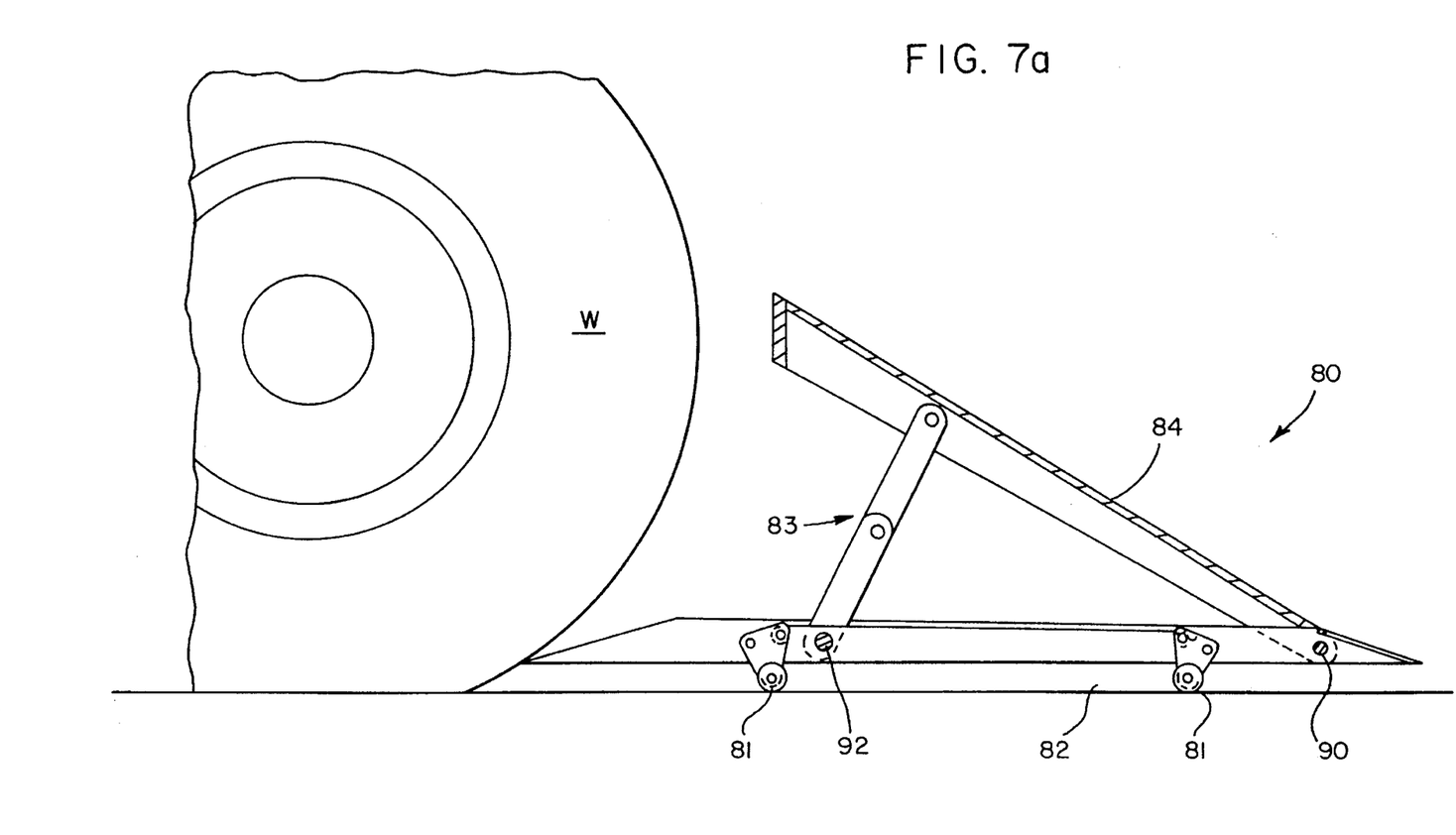
FIG. 7a is an elevational view of the vehicle restraining device in the extended position for engaging a vehicle wheel.

In order to rotate the locking arm 84 between the retracted position shown in FIG. 7 and the extended position shown in FIG. 7a, the sled assembly 54 comprises a crank 94 operatively connected to the locking arm 84 by the linkage assembly generally depicted as 92. Rotation of the crank 94 in the counterclockwise direction as viewed in FIG. 7 causes the crank 94 and the linkage assembly 92 to rotate the locking arm 84 from the retracted position (FIG. 7) to the extended restraining position (FIG. 7a). Conversely, rotation of the crank 94 in the clockwise direction causes the locking arm 84 to return to the retracted position. Rotation of the crank 94 is initiated by a drive link 96 which operatively connects the crank 94 and the trolley assembly 52.

The trolley assembly 52 is generally disposed between the bearings 36p and 36d of the inner bearing assembly 36. As best shown in FIGS. 8–9, the trolley 52 has base plate 56 and two opposing side plates 58 depending from the base plate 56 so as to straddle the drive screw 12 and the drive nut 26. It will be seen that the side plates 58 closely engage the drive nut 26 to minimize rotation of the drive nut 26 in response to the drive screw rotation. The trolley 52 also has two opposing end plates 60 which generally straddle the drive nut 26. The end plates 60 have holes 62 to slidably receive the drive screw 12 and holes 64 to slidably receive the bearing assemblies' tube and rod 37, 40. As the drive nut 26 moves in response to the drive screw rotation, the drive nut 26 engages and pushes the respective end plate 60. Thus, it should now be appreciated that the trolley assembly 52 and the sled assembly 54 will be linearly positioned between the proximal and distal ends 12p, 12d in response to the rotation of the drive screw 12.

In illustrated embodiment, the drive nut 26 is disposed within a closed, self lubricating chamber 65 generally defined by the base plate 56, the side walls 58, the end walls 60, and a bottom plate 66. The base plate 56 has an access hole 68 for introducing lubricant into the closed chamber 65. The drive nut 26 is lubricated as it moves back and forth within the chamber 65.

The trolley 52 also has two opposing side walls 69 projecting upwardly from the base 56 for pivotably receiving one end of the drive link 96 at pivot 72. The other end of the drive link 96 is pivotably connected to the crank 94. The drive link 96 is capable of pushing or pulling the sled assembly 54 between the proximal and distal positions 12p, 12d in response to the movement of the trolley assembly 52.

In operation, the truck is parked in the loading dock D in the conventional manner so that the rear edge of the truck abuts the bumpers B. The lock assembly 80 is typically stored at the distal position 12d of the drive system 10 in the retracted position as generally shown in FIG. 7. It will be appreciated that the low profile of the restraining device 50 will not interfere with the parking operation and the truck may readily drive over the wedge-shaped lock assembly 80.

After the truck is parked, the operator activates the drive screw system 10 which moves the lock assembly 80 from the distal end 12d of the drive screw 12 to an intermediate position wherein the lock assembly 80 engages the truck wheel. In the illustrated embodiment, the motor 16 rotatably drives the screw 12 which linearly positions the drive nut 26 within the guide track 32 leftward, towards the proximal end 12p. As the drive screw 12 rotates, the drive nut 26 pulls the trolley 52 towards the left. The trolley 52, via the link 96 and crank 94, similarly pulls the sled 54 towards the left and into ultimate engagement with the vehicle wheels W. The screw rotation also causes the trolley assembly 52 to move into engagement with the proximal bearing support 36p so that the mobile bearing assemblies 36 dampen any vibration caused by the screw rotation.

The leftward movement of the nut 26 causes the trolley and the sled assemblies 52, 54 to move into initial engagement with the truck wheel W. Although the leftward movement of the lock assembly 80 is substantially terminated by the truck wheel W, the drive screw 12 continues pulling the trolley assembly 52 and the drive link 96, thereby rotating the crank 94 in the counterclockwise direction. The counterclockwise rotation of the crank 94 rotates the linkage assembly 92, causing the locking arm 84 to rotate from the retracted position shown in FIG. 7 to the extended position in FIGS. 7a. The drive nut 26 continues pulling the trolley and sled assemblies 52, 54 until the locking arms 84 securely engages the truck wheel, thereby preventing the truck from movement during the loading/unloading operation. After the locking arms 84 have securely engaged the wheel, the drive screw system 10 is automatically deactivated.

After the loading or unloading operation is completed, the dock operator activates the motor 16 which rotates the drive screw 12 to linearly position the drive lead nut 26 towards the distal end. Since the drive nut 26 is disposed within the trolley chamber, it first moves within the trolley 52 towards the distal end 12d. The rightward movement of the trolley 52 tends to rotate the crank 94 in the clockwise direction. Initially, however, the lock assembly 80 securely engages the truck wheel so that the locking arm 84 cannot rotate from the extended position to the retracted position. Therefore, the drive nut 26 continues driving the trolley and lock assemblies 52, 54 towards the distal end 12d until the locking arm 84 disengages the wheel. After the locking arm 84 has disengaged the wheel, the drive link 96 rotates the crank 54 in the clockwise direction from the extended position, thereby retracting and closing the lock assembly 80. The trolley and sled assemblies 52, 54 are positioned to the distal end 12d for the next vehicle. In the retracted position, the truck may drive over the restraining means 12 and depart from the loading dock.

Figure 10:
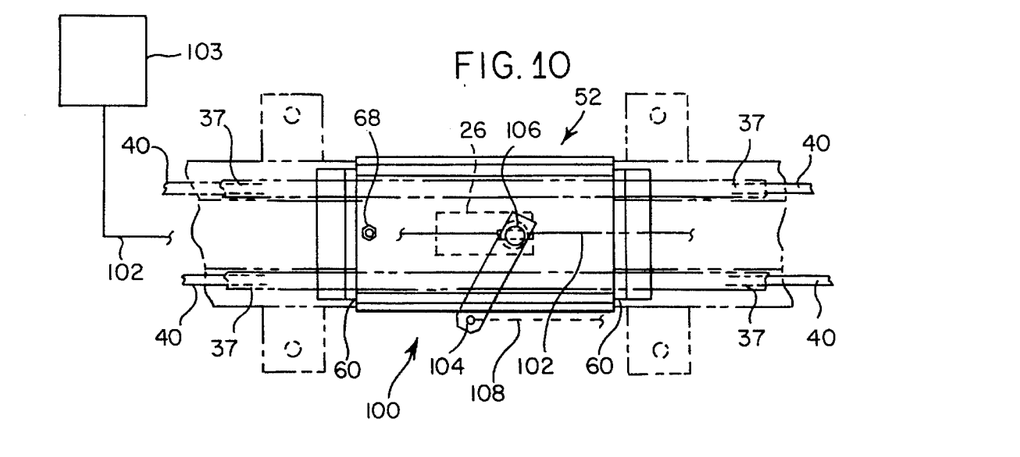
FIG. 10 is a top view of the trolley assembly with a sensor in the neutral, inactivated position.
Figure 11:
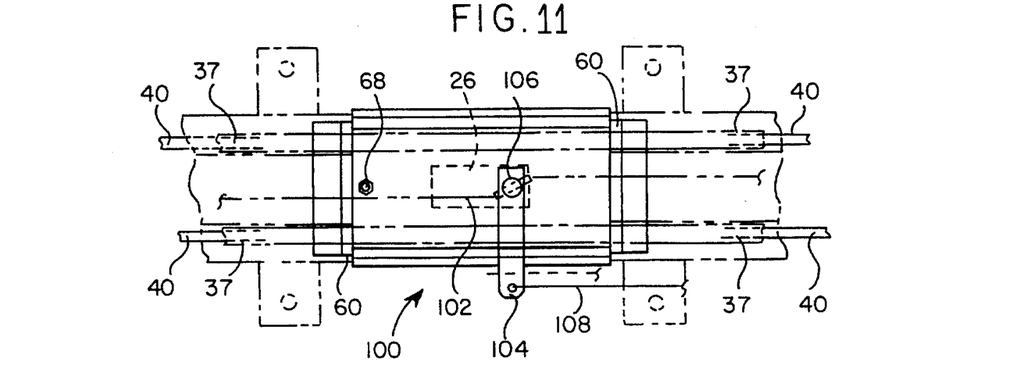
FIG. 11 is a top view of the trolley with a sensor in the active position.

Referring to FIGS. 8–11, means is also provided for sensing the position of the locking arm 84 in the retracted or extended positions. In order to measure the position of lock assembly 80 between the retracted and extended positions, a position sensor means 100 may be operatively connected to the restraining device 50. In the illustrated embodiment, the sensing means 100 comprises a cable 102 positioned between the proximal and distal ends 12p, 12d of the drive screw system 10. A second link 104 is slidably attached to the sensor cable 102 intermediate the proximal and distal ends 12p, 12d. The link 104 is also pivotably attached to the trolley assembly 52 at pivot 106 for movement between a neutral and an active position in response to the relative position between the trolley assembly 52 and the sled assembly 54. A second cable 108 connects the link 104 and the sled assembly 54. When the trolley 52 is adjacent the sled assembly 54 as generally shown in FIG. 7 so that the locking arm 84 is in the lowered position, the link 104 is disposed in the neutral position shown in FIG. 10. Conversely, when the trolley 52 is in spaced relation to the sled assembly 54 and the locking arm 84 is in the raised position, the cable 108 pulls the link 104 into the active position illustrated in FIG. 11. Referring to FIGS. 10 and 11, it will be appreciated that the link 104 slides relative to the cable 102 in the neutral position and the link 104 tensions the cable 102 in the active position. The cable 102 may be attached to a sensor switch which activates a light or other alarm which indicates that the vehicle restraining device 50 is in engagement with the vehicle wheels and the locking arm 84 is in the raised position.

Figure 12:
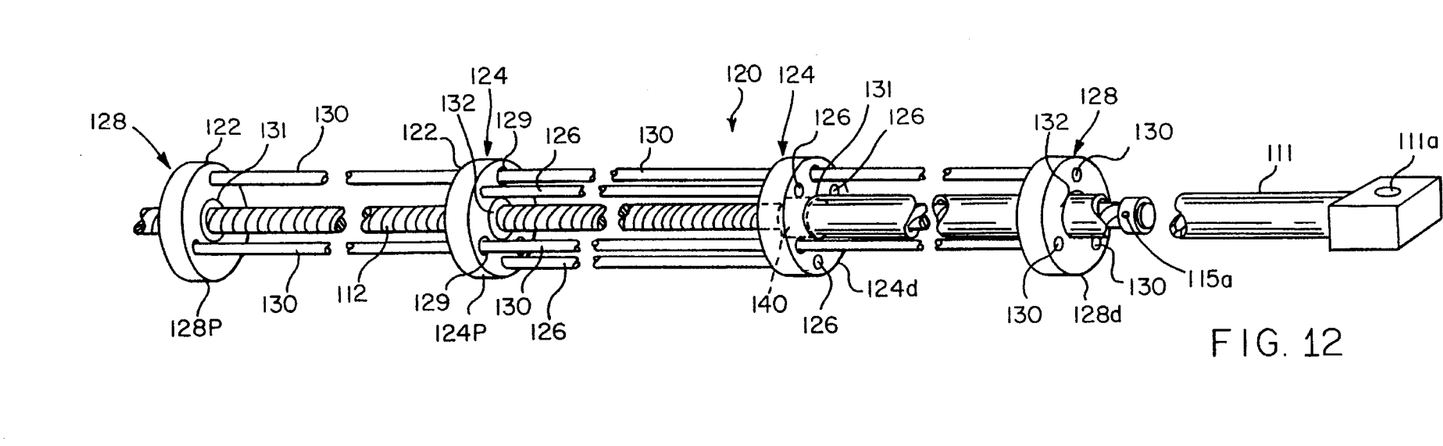
FIG. 12 is a perspective view of another embodiment of the drive screw system disposed in an electric cylinder for linearly positioning an extension tube.
Figure 13:
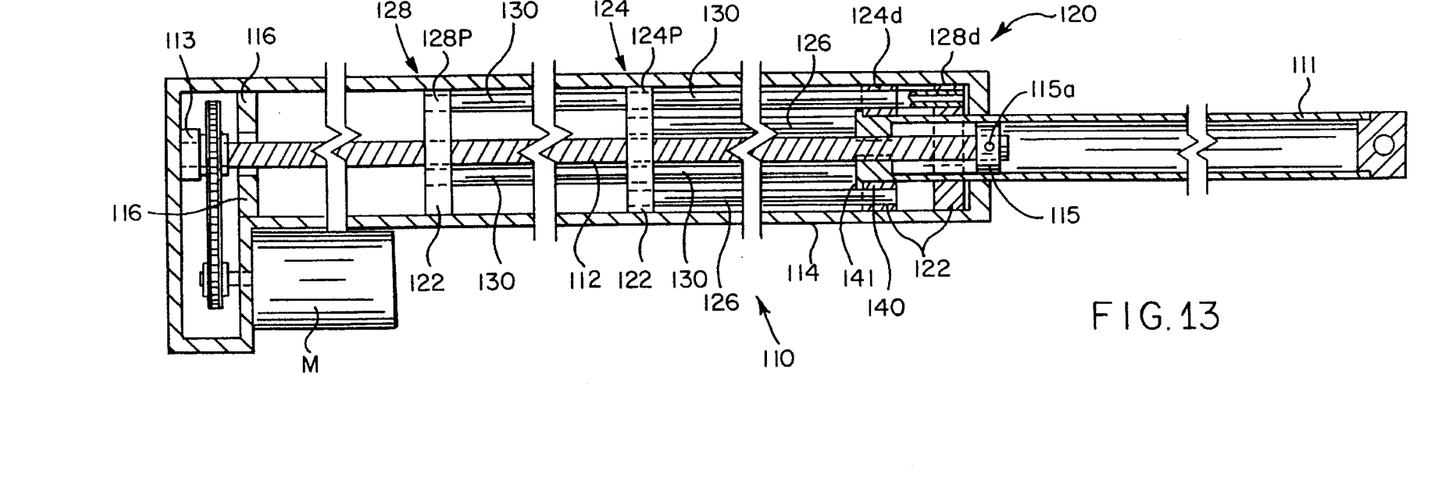
FIG. 13 is a section view of the embodiment of the drive screw system illustrated in FIG. 12.

FIGS. 12–13 illustrate another embodiment of the drive screw system 120 which comprises a plurality of bearing supports 122 disposed in an electric cylinder 110. FIG. 12 illustrates the electric cylinder 110 having an extension tube 111 slidably disposed within a housing 114 so that the extension tube 111 may be linearly extended from the housing 114 in response to rotation of the drive screw 112. The housing 114 has proximal stops 116 for limiting the retraction movement of the extension tube 111.

In this embodiment of the drive screw system 120, a drive screw 112 is rotatably mounted between bearings 113, 115. Bearing 115 is attached to drive screw 112 by pine 115a. Pairs of the bearing supports 122 are rigidly connected together to form a plurality of coaxially nested bearing assemblies 124, 128 which minimize the effective length of the drive screw 112. The illustrated embodiment depicts an inner bearing assembly 124 formed by the proximal and distal bearing supports 124p, 124d which are rigidly connected together by a plurality of rod members 126. Similarly, the outer bearing assembly 128 is formed by proximal and distal bearing supports 128p, 128d which are rigidly connected together by a plurality of the rods 130. The rods 130 which connect the outer bearing supports 124p, 128d slidably engage holes 129 in the inner bearing supports 124 so that the inner and outer assemblies 124, 128 may move independently of each other. The bearing supports 122 have a circular profile although any appropriate cross section may be utilized. Similarly, although the bearing assemblies 124, 128 utilize three rods 126, 130 to resist torsion, any number of rods may be used.

The proximal bearing supports 124p, 128d have a central hole depicted as 132 for slidably receiving the drive screw 112 as best illustrated in FIG. 12. The distal bearing supports 124d, 128d have a central hole 131 adapted to slidably receive the extension tube 111. The drive screw 112 may be operatively connected to a motor M for rotation or other rotation-generating means using any method which will be known to those skilled in the art including, for example, a chain, belt or gear drive.

A drive nut 140, which threadedly engages the drive screw 112 for linear movement in response to rotation of the drive screw 112, is fixedly attached the extension tube 111 so that the extension tube 111 will move into and out of the housing 114 in response to rotation of the drive screw 112. The drive nut 140 and extension tube 111 are restrained from rotation by an external mounting, typically, a pin through extension tube hole 111a and mating mounting cleavice (not shown). The extension tube flange 141 will engage the distal inner bearing 124d as the tube 111 is extended. The inner bearing assembly 124 will engage the outer bearing assembly as described in connection with the first embodiment illustrated in FIGS. 1–6, thereby supporting the drive screw and minimizing any buckling caused by loads exerted on the drive screw 112. Additionally, the distal bearings 124d, 128d will support transverse loading of the extension tube 111.

Thus, it will be seen that a drive screw system has been provided which attains the aforenoted objects. Various additional modifications of the embodiments of the invention specifically illustrated and described herein will be apparent to those skilled in the art, particularly in light of the teachings of this invention.

I claim as my invention:

1. A drive screw system comprising a drive screw adapted for rotation having proximal and distal ends, a drive nut threadedly engaging the drive screw for linearly displacement between the proximal and distal ends of the drive screw in response to rotation of the drive screw, a track having a plurality of bearing assemblies coaxially disposed relative to each other from an inner to an outer bearing assembly and mounted to the track for supporting the drive screw and which automatically moves between the proximal and distal ends of the drive screw in response to the drive nut to automatically maintain a predetermined maximum unsupported length of the drive screw, and wherein each bearing assembly comprises two bearing supports connected at a fixed length.

2. The system as set forth in claim 1 wherein the length of each bearing assembly is integral multiples of the smallest fixed connecting length.

3. The system as set forth in claim 2 wherein the drive screw has stationary bearing supports disposed at the proximal and distal ends and the distance between the stationary supports is (n+1)*L where n is the number of bearing assemblies and L is the length of the shortest bearing assembly.

4. The system as set forth in claim 1 wherein the drive nut is disposed between one pair of bearing supports.

5. The system as set forth in claim 1 wherein the drive nut is disposed between the bearing supports of the innermost bearing assembly.

6. The system as set forth in claim 1 wherein the length of each bearing assembly are integral multiples of the length of the innermost bearing assembly.

7. The system as set forth in claim 6 wherein the drive screw is supported by stationary bearing supports at the proximal and distal ends and the distance between the stationary supports is (n+1)*L where n is the number of bearing assemblies and L is the length of the innermost bearing assembly.

8. The system as set forth in claim 1 wherein at least one bearing assembly is slidable mounted relative to the drive screw.

9. The system as set forth in claim 1 wherein at least one bearing assembly is slidable mounted relative to the track.

10. The system as set forth in claim 9 wherein at least one bearing assembly is slidable mounted relative to the drive screw.

11. A drive screw system comprising a drive screw adapted for rotation having proximal and distal ends, a drive nut threadedly engaging the drive screw for linearly displacement between the proximal and distal ends of the drive screw in response to rotation of the drive screw, means for supporting the drive screw, a plurality of bearing assemblies coaxially disposed relative to each other for supporting the drive screw and which automatically moves between the proximal and distal ends of the drive screw in response to the drive nut to dampen the vibrations of the drive screw, and wherein each bearing assembly comprises opposing supports connected to each other including at least one bearing support.

12. The system as set forth in claim 11 wherein the drive nut is disposed between the supports.

13. The system as set forth in claim 11 wherein each bearing assembly comprises two bearing supports.

14. The system as set forth in claim 13 wherein the length of each bearing assembly are integral multiples of the smallest fixed connecting length.

15. The system as set forth in claim 14 wherein the drive screw has stationary bearing supports disposed at the proximal and distal ends and the distance between the stationary supports is (n+1)*L where n is the number of bearing assemblies and L is the length of the shortest bearing assembly.

16. The system as set forth in claim 11 comprising a plurality of bearing assemblies which are coaxially disposed relative to each other from an inner to an outer bearing assembly.

17. The system as set forth in claim 16 wherein each bearing assembly comprises two bearing supports.

18. The system as set forth in claim 17 wherein the drive nut is disposed between the bearing supports of the innermost bearing assembly.

19. The system as set forth in claim 18 wherein the length of each bearing assembly are integral multiples of the length of the innermost bearing assembly.

20. The system as set forth in claim 17 wherein the drive screw is supported by stationary bearing supports at the proximal and distal ends and the distance between the stationary supports is (n+1)*L where n is the number of bearing assemblies and L is the length of the innermost bearing assembly.

21. The system as set forth in claim 11 wherein the bearing assembly is slidable mounted relative to the drive screw.

22. The system as set forth in claim 11 wherein the bearing assembly is slidable mounted relative to the track.

23. The system as set forth in claim 22 wherein the bearing assembly is slidable mounted relative to the drive screw.

24. A drive screw system comprising a drive screw adapted for rotation having proximal and distal ends, a drive nut threadedly engaging the drive screw for linearly displacement between the proximal and distal ends of the drive screw in response to rotation of the drive screw, means for supporting the drive screw adjacent to a loading dock, at least one bearing assembly for supporting the drive screw and which automatically moves between the proximal and distal ends in response to the drive nut to dampen the vibrations of the drive screw, a vehicle restraining device for restraining a vehicle from movement during the loading and unloading thereof, said vehicle restraining device adapted for moving between the proximal and distal ends of the drive screw in response to rotation of the drive screw.

25. The system as set forth in claim 24 wherein the vehicle restraining device comprises a locking arm mounted for positioning between a retracted position permitting a vehicle to drive to the loading dock and an extended position in which the locking arm extends upwardly for engaging at least one wheel of the vehicle for restraining movement of the vehicle.

26. The system as set forth in claim 24 wherein the vehicle restraining device comprises a base and a locking arm mounted to the base for positioning between a retracted position permitting a vehicle to drive to the loading dock and an extended position in which the locking arm extends upwardly for engaging at least one wheel of the vehicle for restraining movement of the vehicle.

27. The system as set forth in claim 25 comprising a trolley assembly operatively connecting the drive nut and the vehicle restraining device so that the vehicle restraining device may be positioned between the proximal and distal ends in response to the movement of the drive nut.

28. The claim as set forth in claim 27 wherein the trolley assembly has a chamber for receiving the drive nut and for self lubricating the drive nut.

29. The system as set forth in claim 25 comprising means for positioning the locking arm between the retracted and extended positions.

30. The system as set forth in claim 29 wherein the positioning means comprises a crank operatively connected to the locking arm for positioning the locking arm between the retracted and the extended positions and a drive link operatively connecting the crank and the drive nut so that the drive link may actuate the crank in response to the relative positions between the drive nut and vehicle restraining device.

31. A device for restraining a vehicle from movement during the loading and unloading thereof, the vehicle having at least one wheel supported on the driveway, the device comprising:

a drive screw adapted for rotation having proximal and distal ends, a drive nut threadedly engaging the drive screw for linearly displacement between the proximal and distal ends of the drive screw in response to rotation of the drive screw, a lock assembly operatively connected to the drive nut for positioning between a retracted position permitting the vehicle to drive to the loading dock and an extended position in which the lock assembly engages the wheel for restraining movement of the vehicle means for supporting the drive screw on a driveway of the loading dock, at least one bearing assembly for supporting the drive screw and which automatically moves between the proximal and distal ends in response to the drive nut to dampen the vibrations of the drive screw.

32. A drive screw system comprising a drive screw adapted for rotation having proximal and distal ends, a drive nut threadedly engaging the drive screw for linearly displacement between the proximal and distal ends of the drive screw in response to rotation of the drive screw, means for rotatably supporting the drive screw in a housing, at least one bearing assembly mounted for supporting the drive screw intermediate the proximal and distal ends and which automatically moves between the proximal and distal ends in response to the drive nut, an extension tube slidably disposed in the housing and having distal and proximal ends wherein the tube distal end is rigidly affixed to the drive nut so that the extension tube is linearly positioned relative to the housing in response to the movement of the drive nut.

33. The system as set forth in claim 32 comprising a plurality of bearing assemblies which are coaxially disposed relative to each other from an inner to an outer bearing assembly.

34. The system as set forth in claim 32 wherein each bearing assembly comprises two bearing supports connected at a fixed length.

35. The system as set forth in claim 33 wherein the drive nut is disposed between the bearing supports of the innermost bearing assembly.

36. The system as set forth in claim 33 wherein the length of each bearing assembly are integral multiples of the length of the innermost bearing assembly.

37. The system as set forth in claim 36 wherein the drive screw is supported by stationary bearing supports at the proximal and distal ends and the distance between the stationary supports is $(n+1)*L$ where n is the number of bearing assemblies and L is the length of the innermost bearing assembly.

38. A vehicle restraining device for restraining a vehicle from movement in a loading dock during the loading and unloading thereof, the vehicle restraining device comprising:

a locking member movable between proximal and distal positions relative to the loading dock and mounted for positioning between an inactive position permitting the vehicle to drive to the loading dock and an active position in which the locking member for engaging the vehicle for restraining movement of the vehicle, and a sensor assembly operatively connected to the locking member for determining engagement of the locking member comprising a rotary actuator pivotably attached to a base for movement between a neutral and an active position, and a cable member disposed between the proximal and distal positions and engaging the actuator such that the actuator slidably engages the cable member when the actuator is in the neutral position and the actuator produces linear movement in the cable member when the actuator is in the active position.

39. The device as set forth in claim 38 comprising a signal generator operatively connected to the cable member such that the signal generator generates a first signal indicating the locking arm is in the extended position when the linear movement is created in the cable member and a second signal indicating the locking arm is in the retracted position when linear movement is not exerted on the cable member.

40. The device as set forth in claim 38 wherein the sensor assembly comprises another cable member operatively connecting the actuator and the locking member for pivoting the actuator between the neutral position when the locking member is in the inactive position and the active position when the locking member is in the active position.

41. A drive screw system comprising a drive screw adapted for rotation having proximal and distal ends, a drive nut threadedly engaging the drive screw for linearly displacement between the proximal and distal ends of the drive screw in response to rotation of the drive screw, a track having a plurality of bearing assemblies coaxially disposed relative to each other and mounted to the track for supporting the drive screw and which automatically moves between the proximal and distal ends of the drive screw in response to the drive nut to automatically maintain a predetermined maximum unsupported length of the drive screw and wherein each bearing assembly comprises opposing supports connected together at a fixed length including at least one bearing support.

42. The system as set forth in claim 41 wherein each bearing assembly comprises two bearing supports.

43. The system as set forth in claim 41 wherein the opposing supports of each bearing assembly are connected at different lengths.

44. The system as set forth in claim 43 wherein the length of each bearing assembly are integral multiples of the smallest fixed connecting length.

45. The system as set forth in claim 44 wherein the drive screw has stationary bearing supports disposed at the proximal and distal ends and the distance between the stationary supports is (n+1)*L where n is the number of bearing assemblies and L is the length of the shortest bearing assembly.

46. The system as set forth in claim 41 wherein the drive nut is disposed between one pair of bearing supports.

47. The system as set forth in claim 41 wherein the drive assemblies are disposed from an inner to an outer drive assembly.

48. The system as set forth in claim 47 wherein the drive nut is disposed between the bearing supports of the innermost bearing assembly.

49. The system as set forth in claim 48 wherein the length of each bearing assembly are integral multiples of the length of the innermost bearing assembly.

50. The system as set forth in claim 49 wherein the drive screw is supported by stationary bearing supports at the proximal and distal ends and the distance between the stationary supports is (n+1)*L where n is the number of bearing assemblies and L is the length of the innermost bearing assembly.

51. The system as set forth in claim 50 wherein at least one bearing assembly is slidable mounted relative to the drive screw.

52. The system as set forth in claim 51 wherein at least one bearing assembly is slidable mounted relative to the track.

53. The system as set forth in claim 52 wherein at least one bearing assembly is slidable mounted relative to the drive screw.

* * * * *